(12) United States Patent
Oliver (10) Patent No.: US 12,214,955 B2
(45) Date of Patent: Feb. 4, 2025

(54) CAPSULE, SYSTEM AND METHOD FOR PREPARING A BEVERAGE

(71) Applicant: KONINKLIJKE DOUWE EGBERTS B.V., Utrecht (NL)

(72) Inventor: Glen Andrew Oliver, Banbury (GB)

(73) Assignee: KONINKLIJKE DOUWE EGBERTS B.V., Utrecht (NL)

( * ) Notice: Subject to any disclaimer, the term of this patent is extended or adjusted under 35 U.S.C. 154(b) by 833 days.

(21) Appl. No.: 16/340,090

(22) PCT Filed: Oct. 6, 2017

(86) PCT No.: PCT/NL2017/050662
§ 371 (c)(1),
(2) Date: Apr. 5, 2019

(87) PCT Pub. No.: WO2018/067012
PCT Pub. Date: Apr. 12, 2018

(65) Prior Publication Data
US 2020/0047985 A1    Feb. 13, 2020

(30) Foreign Application Priority Data

Oct. 7, 2016   (NL) .................................... 2017587

(51) Int. Cl.
*B65D 85/804*   (2006.01)
*A23F 5/26*   (2006.01)
(Continued)

(52) U.S. Cl.
CPC .......... *B65D 85/8046* (2013.01); *A23F 5/262* (2013.01); *A47J 31/3628* (2013.01);
(Continued)

(58) Field of Classification Search
CPC ............................ B65D 85/8043; A23F 5/262
See application file for complete search history.

(56) References Cited

U.S. PATENT DOCUMENTS 4,860,645 A * 8/1989 van der Lijn ...... B65D 85/8043
99/295
2009/0017177 A1   1/2009 Yoakim et al.
(Continued)

FOREIGN PATENT DOCUMENTS

AU            655184        12/1994
AU       2015255218 A1      11/2015
(Continued)

OTHER PUBLICATIONS

International Search Report and Written Opinion, PCT/NL2017/050662, 11 pages (Jan. 19, 2018).

*Primary Examiner* — Erik Kashnikow
*Assistant Examiner* — Chaim A Smith
(74) *Attorney, Agent, or Firm* — Fitch, Even, Tabin & Flannery LLP (57) ABSTRACT

In a capsule containing a substance constituted by a mass of loose, solid particles, for the preparation of a potable beverage by extracting and/or dissolving the substance by means of supplying a fluid under pressure into the capsule, a screen, permeable to water and impermeable to a predominant portion of particles of the substance is positioned between the substance and the bottom. The screen is attached to the capsule body in such a manner that the screen releases from the capsule body during brewing. A beverage brewing system comprising such a capsule and a method of use of such a capsule are described as well.

8 Claims, 4 Drawing Sheets

(51) Int. Cl.
*A47J 31/36* (2006.01)
*A47J 31/40* (2006.01)

(52) U.S. Cl.
CPC ......... *A47J 31/3633* (2013.01); *A47J 31/407* (2013.01); *B65D 85/8061* (2020.05)

(56) References Cited

U.S. PATENT DOCUMENTS

| | | |
|---|---|---|
| 2009/0320692 A1 | 12/2009 | Simanski |
| 2010/0015307 A1 | 1/2010 | Abegglen et al. |
| 2011/0185910 A1 | 8/2011 | Ryser |
| 2012/0070551 A1 | 3/2012 | Mahlich |
| 2013/0099597 A1 | 4/2013 | Perentes et al. |
| 2013/0180408 A1 | 7/2013 | Eichler et al. |
| 2014/0170271 A1 | 6/2014 | Zweed et al. |
| 2014/0178537 A1 | 6/2014 | Zweed et al. |
| 2016/0311608 A1* | 10/2016 | Accursi ............... A47J 31/0673 |
| 2016/0314954 A1* | 10/2016 | Schmid ................ B01L 9/523 |

FOREIGN PATENT DOCUMENTS

| | | |
|---|---|---|
| AU | 2016253679 A1 | 11/2016 |
| AU | 2017219060 A1 | 9/2017 |
| CA | 2901582 A1 | 11/2014 |
| CN | 104986456 | 10/2015 |
| DE | 10 2008 014 758 A1 | 10/2009 |
| DE | 20 2009 009 125 U1 | 9/2010 |
| DE | 10 2010 027 484 A1 | 1/2012 |
| DE | 10 2010 034 260 A1 | 2/2012 |
| DE | 10 2010 047 890 A1 | 2/2012 |
| DE | 20 2013 005 950 U1 | 11/2013 |
| DE | 20 2015 004 716 U1 | 10/2015 |
| EP | 0468079 | 1/1992 |
| EP | 0 844 195 B1 | 5/1998 |
| EP | 1 165 398 B1 | 1/2002 |
| EP | 1 190 959 A1 | 3/2002 |
| EP | 1 190 959 B1 | 3/2002 |
| EP | 1 299 022 B1 | 4/2003 |
| EP | 1 339 305 B1 | 9/2003 |
| EP | 1 646 305 B1 | 4/2006 |
| EP | 1 654 966 B1 | 5/2006 |
| EP | 1 700 548 B1 | 9/2006 |
| EP | 1 700 584 A1 | 9/2006 |
| EP | 1 816 934 B1 | 8/2007 |
| EP | 1 839 543 B1 | 10/2007 |
| EP | 1 849 715 B1 | 10/2007 |
| EP | 1 859 712 B1 | 11/2007 |
| EP | 1 859 714 B1 | 11/2007 |
| EP | 1 882 431 B1 | 1/2008 |
| EP | 1 882 432 B1 | 1/2008 |
| EP | 1 892 199 A1 | 2/2008 |
| EP | 1 900 653 B1 | 3/2008 |
| EP | 1 967 099 B1 | 9/2008 |
| EP | 2 012 994 B1 | 1/2009 |
| EP | 2 029 457 B1 | 3/2009 |
| EP | 2 068 684 B1 | 6/2009 |
| EP | 2 070 828 B1 | 6/2009 |
| EP | 2 142 054 B1 | 1/2010 |
| EP | 2 151 313 B1 | 2/2010 |
| EP | 2 205 133 B1 | 7/2010 |
| EP | 2 229 082 B1 | 9/2010 |
| EP | 2 230 195 A1 | 9/2010 |
| EP | 2 284 100 B1 | 2/2011 |
| EP | 2 284 101 B1 | 2/2011 |
| EP | 2 334 564 B1 | 6/2011 |
| EP | 2 364 930 A2 | 9/2011 |
| EP | 2 374 383 B1 | 10/2011 |
| EP | 2 385 922 B1 | 11/2011 |
| EP | 2 489 609 A1 | 8/2012 |
| EP | 2 512 302 B1 | 10/2012 |
| EP | 2 573 008 A1 | 3/2013 |
| EP | 2 631 198 A1 | 8/2013 |
| EP | 2 631 199 A1 | 8/2013 |
| EP | 2 682 028 A1 | 1/2014 |
| EP | 2 690 035 A1 | 1/2014 |
| EP | 2 712 824 A1 | 4/2014 |
| EP | 2 757 056 A1 | 7/2014 |
| EP | 2 801 538 A1 | 11/2014 |
| EP | 2 868 598 A1 | 5/2015 |
| EP | 3 023 360 B1 | 5/2016 |
| ES | 1137034 U | 3/2015 |
| ES | 1142506 U | 8/2015 |
| FR | 2973209 A1 | 10/2012 |
| GB | 2 503 697 B | 12/2014 |
| GB | 2 519 319 A | 4/2015 |
| GB | 2 503 774 B | 6/2015 |
| GB | 2 523 775 A | 9/2015 |
| RU | 2520587 | 6/2014 |
| WO | WO-2006/045536 A1 | 5/2006 |
| WO | WO-2007/122206 A1 | 11/2007 |
| WO | WO-2008/037642 A1 | 4/2008 |
| WO | WO-2009/128016 A1 | 10/2009 |
| WO | WO-2010/055465 A1 | 5/2010 |
| WO | WO-2010/084475 A2 | 7/2010 |
| WO | WO-2010/115970 A1 | 10/2010 |
| WO | WO-2010/116284 A2 | 10/2010 |
| WO | WO-2010/128844 A1 | 11/2010 |
| WO | WO-2010/137952 A1 | 12/2010 |
| WO | WO-2011/000005 A1 | 1/2011 |
| WO | WO-2011/010263 A1 | 1/2011 |
| WO | WO-2011/113854 A2 | 9/2011 |
| WO | WO-2012/011053 A1 | 1/2012 |
| WO | WO-2012/013556 A1 | 2/2012 |
| WO | WO-2012/038063 A1 | 3/2012 |
| WO | WO-2012/045184 A1 | 4/2012 |
| WO | WO-2012/110323 A1 | 8/2012 |
| WO | WO-2012/118367 A1 | 9/2012 |
| WO | WO-2012/120459 A1 | 9/2012 |
| WO | WO-2012/122329 A1 | 9/2012 |
| WO | WO-2012/123857 A1 | 9/2012 |
| WO | WO-2012/144885 A1 | 10/2012 |
| WO | WO-2013/043048 A1 | 3/2013 |
| WO | WO-2013/046014 A1 | 4/2013 |
| WO | WO-2013/060654 A1 | 5/2013 |
| WO | WO-2013/060918 A1 | 5/2013 |
| WO | WO-2013/068242 A1 | 5/2013 |
| WO | WO-2013/079811 A1 | 6/2013 |
| WO | WO-2013/132435 A1 | 9/2013 |
| WO | WO-2013/135937 A2 | 9/2013 |
| WO | WO-2013/136209 A1 | 9/2013 |
| WO | WO-2013/136240 A1 | 9/2013 |
| WO | WO-2013/144838 A1 | 10/2013 |
| WO | WO-2013/153169 A2 | 10/2013 |
| WO | WO-2013/157927 A1 | 10/2013 |
| WO | WO-2013/164669 A1 | 11/2013 |
| WO | WO-2013/189923 A1 | 12/2013 |
| WO | WO-2013/190426 A1 | 12/2013 |
| WO | WO-2014/001584 A1 | 1/2014 |
| WO | WO-2014/012779 A2 | 1/2014 |
| WO | WO-2014/012783 A2 | 1/2014 |
| WO | WO-2014/033344 A1 | 3/2014 |
| WO | WO-2014/053638 A1 | 4/2014 |
| WO | WO-2014/067507 A2 | 5/2014 |
| WO | WO-2014/072942 A2 | 5/2014 |
| WO | WO-2014/076041 A1 | 5/2014 |
| WO | WO-2014/118812 A1 | 8/2014 |
| WO | WO-2014/125390 A1 | 8/2014 |
| WO | WO-2014/128315 A1 | 8/2014 |
| WO | WO-2014/167526 A1 | 10/2014 |
| WO | WO-2014/184651 A1 | 11/2014 |
| WO | WO-2014/184652 A1 | 11/2014 |
| WO | WO-2014/184653 A1 | 11/2014 |
| WO | WO-2014/191412 A1 | 12/2014 |
| WO | WO-2014/191413 A1 | 12/2014 |
| WO | WO-2014/198474 A1 | 12/2014 |
| WO | WO-2014/202105 A1 | 12/2014 |
| WO | WO-2015/011683 A1 | 1/2015 |
| WO | WO-2015/056202 A1 | 4/2015 |
| WO | WO-2015/075584 A1 | 5/2015 |
| WO | WO-2015/082982 A1 | 6/2015 |
| WO | WO-2015/087180 A1 | 6/2015 |
| WO | WO-2015/101394 A1 | 7/2015 |
| WO | WO-2015/104171 A1 | 7/2015 |

(56) References Cited

FOREIGN PATENT DOCUMENTS

| | | |
|---|---|---|
| WO | WO-2015/104172 A1 | 7/2015 |
| WO | WO-2015/128527 A1 | 9/2015 |
| WO | WO-2015/128799 A1 | 9/2015 |
| WO | WO-2015/128827 A1 | 9/2015 |
| WO | WO-2015/180960 A1 | 12/2015 |
| WO | WO-2016/041596 A1 | 3/2016 |
| WO | WO-2016193961 A2 * 12/2016 ......... B65D 85/8043 |

* cited by examiner

CAPSULE, SYSTEM AND METHOD FOR PREPARING A BEVERAGE

CROSS-REFERENCE TO RELATED APPLICATIONS

This application is a National Stage Application of PCT/NL2017/050662, filed Oct. 6, 2017, which claims the benefit of and priority to Netherlands Patent Application No. NL 2017587, filed Oct. 7, 2016, the entire contents of both are hereby incorporated herein by reference.

FIELD AND BACKGROUND OF THE INVENTION

The invention relates to a capsule according to the introductory portion of claim 1. Such a capsule is known from European patent application 0 468 079.

In practice, such capsules are mostly arranged and used for extracting coffee, by pressing an injection fluid such as hot water under pressure through powder obtained by grinding roasted coffee beans. However, the substance, which may be in the form of for instance granules, chips or flakes, may also be constituted by or contain constituents that are to be dissolved and/or entrained, such as sugar or milk powder. Substances to be extracted may also be of other types than coffee, such as tea or herbs.

Widely used in the market are capsules of which the capsule body is of aluminium or plastic and of which the open end is sealed-off by a thin sheet, usually of aluminium. The closed end of the capsule body is typically referred to as the bottom. The coffee machines have a housing in which a major portion of capsule body can be received and a closing member. The housing and/or the closing member is/are movable relative to the other between an operating position in which the flange of the capsule is clamped between the housing and a closing member and a transfer position leaving an opening through which a used capsule can be removed from the housing and a fresh capsule can be positioned in the housing. Piercing elements are provided which in use pierce a bottom portion of the capsule body inside the housing.

When pressurised fluid is fed into the housing, it penetrates the capsule through the holes made by the piercing element, and causes an increase in the internal pressure which causes the cover to be torn, for instance with assistance of piercing members of the closing member. Then, a flow of water is pressed into the substance and brewed beverage exits the capsule and guided to a receptacle of the user outside of the machine. The cover may also be to some extent open prior to injection of the pressurized fluid, for instance if the capsule is packaged in a barrier material for retaining flavours, which barrier material is to be removed prior to use.

Substance may leave the capsule through the pierced openings when the piercing elements are retracted out of the capsule.

The screen may also affect the distribution of the flow of water through the substance and in particular its uniformity over all of the substance and for the entire duration of the beverage making stage. Also, the degree of compression of the substance and formation of foam ("crema") appears to be affected by the screen.

While properties affecting cleanliness of the coffee machine and organoleptic and visual quality of the beverage are important, manufacturing costs and suitability for recycling of materials used are also important for a packaging product such as capsules, which are manufactured in large numbers.

Over the course of time, many solutions have been proposed for the screen or filter for retaining the substance in the capsule after it has been opened. For instance in European patent application 0 468 079, the screen is welded to a shoulder inside the capsule body, the screen being detached from the bottom of the capsule.

European patent application 1 165 398 discloses a screen that can be pierced or be provided with an opening through which the piercing element can pass and be retracted. Such a pre-cut opening is in the form of a cross-shaped cut-out and closed when the piercing element is retracted for retaining coffee behind the screen.

European patent application 1 190 959 discloses a screen in the form of a fabric sheet that is sealed to the bottom of the cup over two zones, on the one hand a central part and on the other hand along the periphery of the bottom, allowing the piercing elements to enter in a spacing left between the capsule bottom and the screen between the central and peripheral sealed zones.

European patent application 2 516 296 discloses a screen in the form of a filter element of non-woven material produced from fine plastic fibres, the screen being attached via a dust proof sealing along the periphery of the screen.

WO2015/087180 discloses arranging the screen in the form of a filter element between the substance and the capsule bottom without attachment of the screen to the capsule, so that it is free to move away from the bottom except for the resistance applied by the powdered food substance.

SUMMARY OF THE INVENTION

It is an object of the present invention to provide a capsule which can be manufactured in a simple manner at low costs and which is further improved with respect to processing of the substance into a beverage of high organoleptic and visual quality.

According to the invention, this object is achieved by providing a capsule according to claim 1.

Because the screen is attached to the capsule body in such a manner that the screen releases from the capsule body during brewing, the screen is allowed to move away from the bottom of the capsule body more completely as the liquid is injected into the capsule. Preferably, the entire screen moves away from the bottom of the capsule body in response to the liquid being injected into the capsule so as to become entirely spaced from the bottom. Thus more room is left between the screen and the capsule body bottom for radial water distribution over the substance. On the other hand, because the screen is attached to the capsule body prior to brewing, the screen is reliably held in place during filling and subsequent handling of the capsule prior to brewing, even if the capsule is shaken, e.g. during transport.

The screen may for instance be made from a filter material provided with a plurality of passages that are large enough to allow at least smaller ones of particles of the substance to pass through. More particularly the filter material may be a non-woven material. It shows that such a screen provides an excellent water distribution over the substance bed (in particular ground coffee bed) so that extraction is improved. Without being bound to theory, it is expected that the improved extraction is obtained by a combination of the porosity of the filter material on the one hand and the passages in the filter material on the other hand.

The passages may for instance have a diameter of 1-4 mm. The diameter of the screen may for instance be 20-40 mm, for example 22-30 mm. The diameter of the bottom of the capsule may for instance be 20-40 mm, for example 22-30 mm. The diameter of the screen may be about the same as (e.g. 95-105% of) the diameter of the bottom at the inside of the capsule. The screen may for instance be provided with 4-30 passages, preferably about 15-25 passages. The screen area including a pattern of the passages may cover 50-100% of the bottom, the remainder of the screen area being free of a pattern of the passages. In a practical embodiment the screen is provided with 15-18 passages each having a diameter of 1.5-2.5 mm, preferably 1.6-2.2 mm, more preferably of 1.6-1.8 mm.

The screen material may for instance have a weight of 20-200 g/cm$^2$, preferably 40-100 g/cm$^2$. The screen material may for instance have a thickness of 0.1-1 mm, preferably 0.2-0.5 mm. The screen material (without the passages) may for instance have an air permeability between 500 and 3000 l/(m$^2$s) at a pressure drop of 100 Pa over the screen material, preferably between 1000 and 1500 l/(m$^2$s) at a pressure drop of 100 Pa over the screen material.

Particular elaborations and embodiments of the invention are set forth in the dependent claims. The invention may also be embodied in a system as set forth herein.

Further features, effects and details of the invention appear from the detailed description and the drawings.

DETAILED DESCRIPTION

Figure 1:
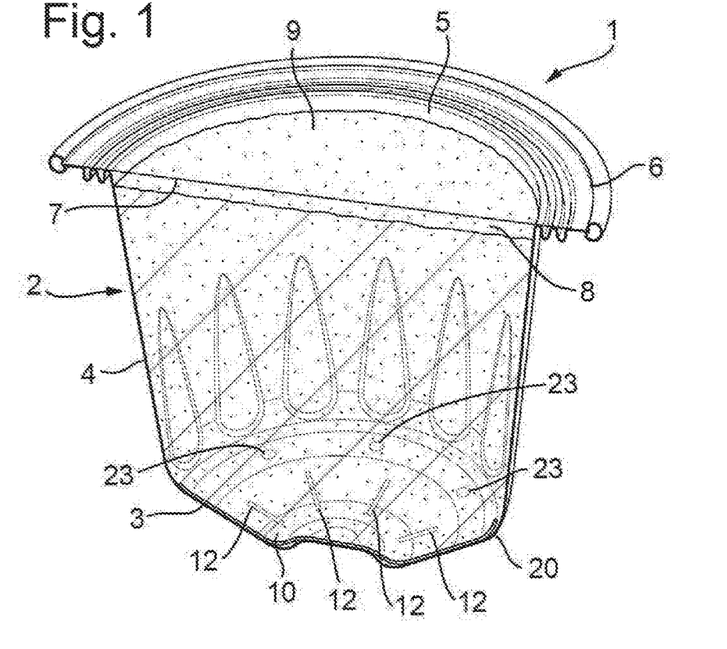
FIG. 1 is a perspective cross-sectional view of a first example of a capsule according to the invention.
Figure 2:
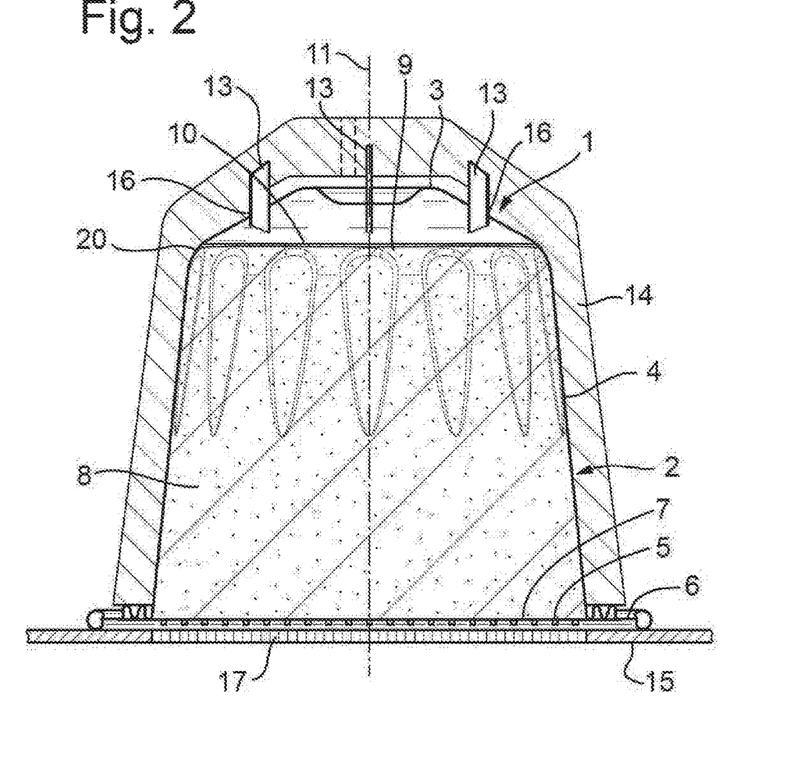
FIG. 2 is a schematic cross-sectional side view of the capsule according to FIG. 1 positioned between a housing and a closing member of a coffee making machine and with a screen released from a capsule body.

In FIGS. 1 and 2 a first example of a capsule 1 according to the invention is shown. The capsule 1 has a capsule body 2 having a bottom 3, a side wall 4, an end 5 opposite of the bottom 3 and a flange 6 extending outwardly from the side wall 4 and around the open end 5. A cover 7 of the capsule is attached to the outwardly extending flange 6 and hermetically closes off the end 5 of the capsule body 5 opposite of the bottom 3. For illustrative purposes, the cover 7 is shown as a transparent member. The cover may also be open to some extent, for instance in an embodiment in which the capsule is packaged in a flavour retaining barrier that is to be removed prior to use and in which the cover does not have to be opened further to allow the brewed beverage to flow through.

The capsule body 2 and the cover 7 bound a capsule chamber 8. The capsule chamber 8 contains a substance 9 constituted by a mass of loose, solid particles, for the preparation of a potable beverage by extracting and/or dissolving the substance by means of supplying an injection fluid under pressure into the capsule.

In this example and in embodiments of the invention in general, the substance can for instance be ground, roasted coffee beans, but may also be another substance from which constituents are to be extracted and/or which is to be dissolved and/or emulsified when pressurised injection liquid such as hot water is passed through, for instance tea, milk powder and/or sugar, or dried soup. The substance may for instance be 5-40 grams, preferably 5-30 grams, more preferably 5-14 grams of roasted and ground coffee.

For compatibility with widely used coffee machines, it is generally preferred that the capsule is in accordance with one or more of the following features, wherein dimensions are to be selected within these ranges depending on the type of coffee making machine in which the capsule is to be used:

the outer diameter of the outwardly extending flange is approximately 37-45 mm, the diameter of the bottom of the capsule is about 23-30 mm, an inner edge of a curled outer edge of the outwardly extending flange has a radius about the central capsule body axis of 32-42 mm, the curled outer edge of the outwardly extending flange has a largest dimension of about 1.2-1.6 mm, the inner diameter of the free end of the side wall of the capsule body is about 29-35 mm, the distance between the free end of the side wall of the capsule body and an outermost edge of the outwardly extending flange is about 3.5-5 mm, a height of the capsule body is about 28-40 mm, the capsule body is truncated, wherein preferably the side wall of the capsule body encloses an angle with a line transverse to the central capsule body axis of about 94-98°, the bottom of the capsule body has a largest inner diameter of about 23-29 mm, the bottom of the capsule body is truncated, preferably having a bottom height of about 4-7 mm and wherein the bottom further has a generally flat central portion opposite the cover having a diameter of about 8-11 mm, the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm.

The wall thickness of the cover (preferably made of aluminium) is preferably smaller than the wall thickness of the capsule body, which may for instance be of aluminium or plastic material, such that the cover can be caused to open with assistance of a pressure applied to the capsule chamber, for instance by causing the aluminium cover to tear open on a closing member of the beverage preparation device, such as an extraction plate of the beverage preparation device, under the influence of fluid pressure in the capsule.

In the capsule chamber 8, a screen 10, of a material permeable to water and impermeable to a predominant portion of the particles of the substance 9 is arranged. The screen 10 is positioned between the substance 9 and the bottom 3 of the capsule and has a centre approximately coaxial with a centre line 11 of the capsule 1. In the condition shown in FIG. 1, the screen 10 is attached to the capsule body 1 along attachment zones 12 spaced from the centre 11 and circumferentially spaced from each other. In the condition shown in FIG. 2, the screen 10 is released from the capsule body 2, i.e. no longer attached to the capsule body 2 and rests on the substance 9 in the capsule.

In some embodiments, it may sometimes, mostly or always occur that the screen is not fully released from the bottom of the capsule body. Depending on the pattern of non-released attachment areas, this may cause the position of the screen in the capsule body to become skewed. However, probably due to the permeability of the screen, this has not been found to noticeably affect the quality of the brewed beverage.

The attachments in zones 12 keep the screen 10 in position in the capsule 1 immediately after it has been fixed to the bottom, during filling of the capsule and during storage and handling prior to brewing, yet interfere very little with liquid flow through the screen 10, since the screen 10 is released from the bottom 3 of the capsule body 2 during brewing, so that a relatively large portion of the screen 10 up to its peripheral edge is available for liquid to pass through and the screen 10 is moved to a position spaced from the bottom 3 of the capsule body 2 relatively far and over substantially its entire surface area, so as to leave more room for the liquid entering the capsule via piercings 16 made in the bottom 3 by piercing elements 13 to be easily distributed radially over the surface area of the screen 10 and the substance 9 downstream of the screen 10.

In the present example, the screen 10 is attached such that the attachments 12 tear apart during brewing. Thus, it is ensured that the screen 10 is released quickly as a pressure drop over the screen 10 builds up during brewing.

The screen 10 is attached to the bottom 3 in attachment zones 12 which are elongated in a racial direction and have most inward ends radially spaced from a central axis 11 of the capsule 1. When brewing starts, the screen 10 will bulge out in a central area, so that peeling forces exerted on the attachment zones 12 will be concentrated at the inward ends thereof. Since these attachment zones 12 are elongated in radial direction, these zones 12 are relatively small in circumferential sense. Therefore, the force pulling the screen 10 off the bottom 3 is concentrated in very small ranges in circumferential sense, so that a large peeling tension is exerted at the inward ends of the attachment zones and relatively little force is required to initiate peeling the screen 10 off the bottom 3. Once peeling has been initiated, the current inner ends of the remaining attachment zones 12 move racially outward until the outer ends of the attachment zones 12 are reached. Then, the screen 10 is completely detached from the bottom 3.

For facilitating peeling along the length of the attachment zones 12, the attachment zones 12 preferably have a width of less than 2 mm and more preferably of less than 1 or 0.6 mm. For reliability of attachment and ease of manufacturing a largest attachment zone width of at least 0.3 or 0.4 mm is preferred.

The screen 10 is provided with a plurality of passages 23 dimensioned so that at least a fraction of the substance 9 can pass through the passages 23 in solid form. The fraction of the substance 9 that can pass through the passages may for instance be the smallest 10%, 30% or 50% of the substance 9. It may also be provided that all particles of the substance are in principle capable of passing through the passages or that some of the passages allow a larger fraction of the substance to pass through than other ones of the passages. Also, even though particles are in principle capable of passing through the passages, in practice most of the substance, and also most of the fraction that can pass through the passages, will in fact not pass through the passages. This is because, after brewing, most of the substance is not exposed to backflow of sufficient magnitude to entrain these particles through the passages and because particles tend to cling to each other after having been wetted. However, it has been found that an appreciable amount of particles does pass through the passages and even to the outside of the capsule, so that after brewing a sample of the substance from which the beverage is brewed is visible and can easily be smelled by the consumer.

Moreover, these passages 23 allow water distribution over the substance 9, through which the water is pressed with a smaller pressure drop over the screen, because the relatively large passages provide distributed local areas where flow resistance is particularly low. This allows water to be distributed over flow paths including flow paths of a relatively great length, where pressure drop per unit of flow distance would otherwise be relatively low. Also any tendency of water to pass along flow paths circumventing the screen 10 or to pass to a relatively large extent through a hole pierced in the screen is reduced, because the pressure drop over the screen 10 is lowered. Reducing the pressure drop over the screen 10 further provides the advantage that more of the overall pressure drop is left as a net pressure drop over the substance 9, so that extraction can be more intensive.

To allow the screen 10 to be displaced by the piercing elements 13 easily, without being pierced thereby, the screen 10 is preferably made of flexible material, such as paper, plastic film, or fibre material in the form of a woven, non-woven or knitted structure. Good brewing results at low costs can be achieved if the screen 10 is of filter paper. If the filter paper contains thermoplastic constituents such as fibres and/or binder material, these can be used for sealing to the capsule body in the attachment zones, as will be described in more detail.

For allowing the screen 10 to be displaced by the piercing elements 13 easily, it is also advantageous if all the attachment zones are distributed along a periphery of the screen element only.

In FIG. 2 also relevant parts of a coffee machine, which, together with the capsule 1, form a beverage brewing system, are shown. These parts include a housing 14 in which a major portion of capsule body 2 can be received and a closing member 15 with passages 17 for allowing a prepared beverage to flow away from the capsule 1. The housing 14 and/or the closing member 15 is/are movable relative to the other between an operating position in which the flange 6 of the capsule 1 is clamped between the housing 14 and the closing member 15 and a transfer position leaving an opening through which a used capsule 1 can be removed from the housing 14 and a fresh capsule 1 can be positioned in the housing 14. The piercing elements 13, which are arranged for, in use, piercing a bottom portion 3 of the capsule body 2 inside the housing 14 in several piercing locations 16 (in principle a single piercing element for piercing in a single location would be possible as well; in this example three piercing elements are provided which lay on a circle such that each of the piercing elements pierces the capsule just outside a central part of the bottom). Such coffee machines are commercially available and therefore not described in more detail.

In operation, the capsule 1 is positioned in the housing 14 and clamped between the housing 14 and the closing member 15 with perforations 17 for allowing brewed beverage outputted through the cover 7 to flow away from the capsule 1. A bottom portion 3 of the capsule body 2 inside the housing 14 is pierced and pressurised injection fluid, such as hot water, is fed into the housing 14, causing the injection fluid to penetrate the capsule 1 through at least one hole 16 pierced in the bottom 3. The hole may also have been provided in the bottom prior to placing the capsule in the housing, e.g. during manufacturing.

Then, the cover 7 is caused to be torn, preferably under the influence of fluid pressure in the capsule 1 and a flow of the injection fluid is passed at least partially through the screen 10, into and through the substance and through the cover so that a brewed beverage exits the capsule; and the brewed beverage is guided to a receptacle.

Since the passages 23 are dimensioned to allow particles of the substance 9 to pass through in solid form, an appreciable amount of the particles will pass to the outside of the capsule body 2 as and/or after the piercing elements 13 have been retracted and pressure is no longer applied to the capsule 2. Thus, the user can see and better smell some of the substance from which the beverage has been brewed, which enhances the similarity to and association with brewing coffee in a manually filled brewing apparatus such as a conventional espresso machine that has to be filled with ground coffee manually.

For radial distribution of water, it is preferred that at least some of the passages 23 are located peripherally of the location or locations of the piercings 16 or of openings pre-fabricated in the bottom.

Figure 3:
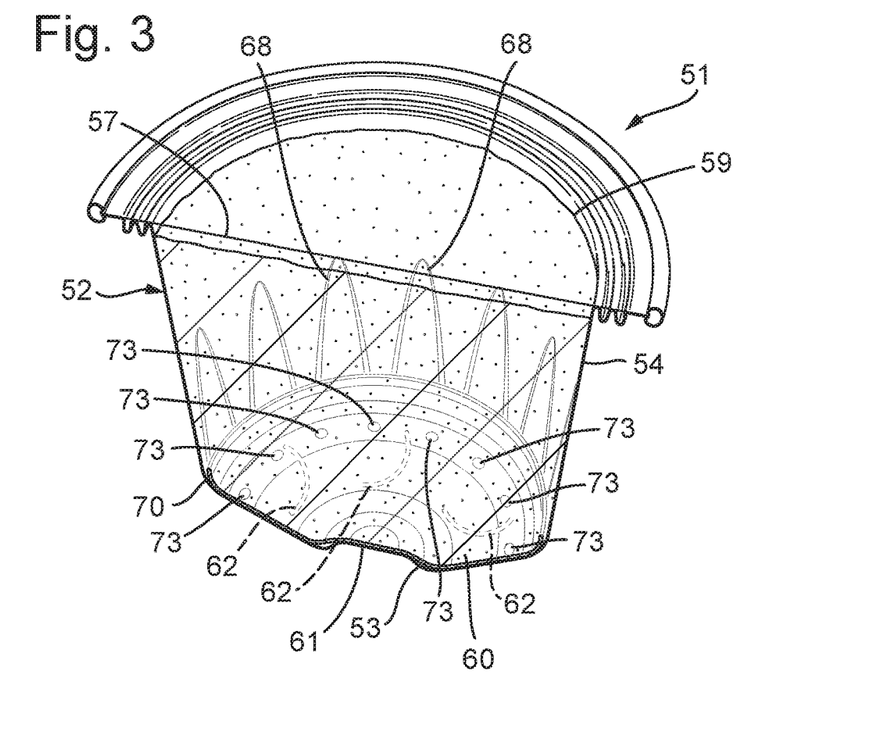
FIG. 3 is a perspective cross-sectional view of a second example of a capsule according to the invention.

In FIG. 3 a second example of a capsule 51 according to the invention is shown. In principle, only features of this capsule 51 that differ significantly from the capsule 1 shown in FIGS. 1 and 2 are described. For illustrative purposes, the cover 57 in FIG. 3 is shown as a transparent member.

In this capsule 51, the attachment zones 62 are also elongated, but extend circumferentially from inward ends and are curved to extend more radially towards the outer ends. This allows relatively long attachment zones 62 for reliable attachment while peeling in radial direction becomes easier towards the radially outer ends of the attachment zones 62, when peeling forces tend to become smaller.

In this example, the passages 73 through the screen 60 that are large enough to allow particles of the substance 59 to pass through in solid form are arranged in a single circle instead of in two concentric circles as the example shown in FIGS. 1 and 2.

Figure 4:
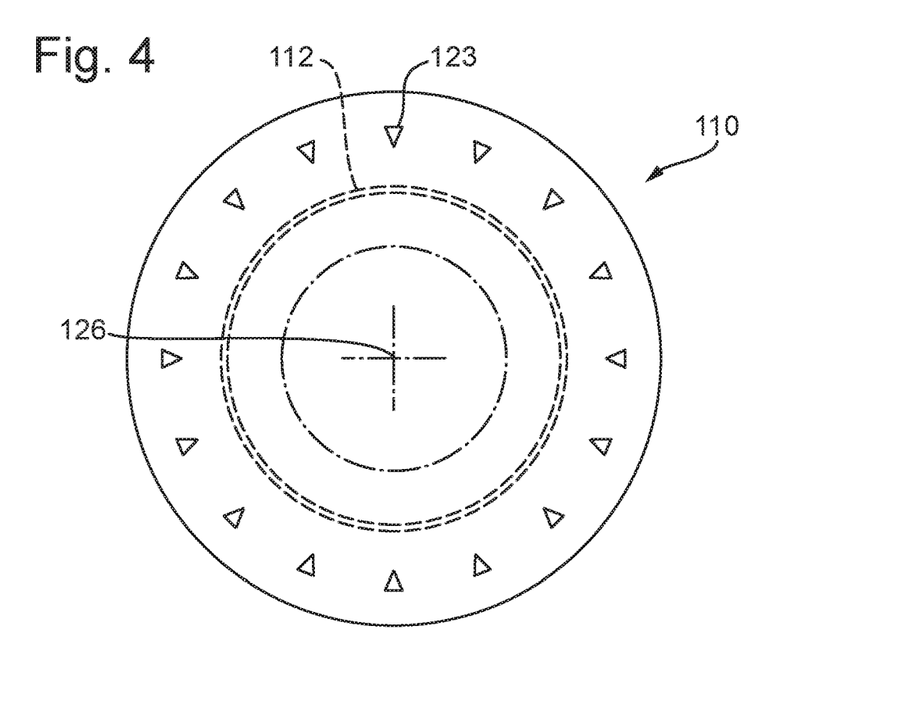
FIG. 4 is top plan view of a screen of a third example of a capsule according to the invention.

In FIG. 4 yet another example of a screen 110 for a capsule according to the invention is shown. In this example, the attachment zone 112 is in the form of an endless closed loop around the central axis of the screen 110. In such an embodiment, the attachment zone 112 has no free extreme end where peeling may be initiated. However, because the brewing liquid cannot escape otherwise than through the screen 110, the attachment zone will be in relatively intimate contact with the brewing liquid and the pressure drop of the screen 110 will be relatively large, in particular if the screen 110 is of a material that is impermeable to liquid or has a low liquid permeability only and if no passages through the screen material are located inside the loop formed by the attachment zone and all openings in the bottom through which liquid enters are inside of the attachment loop.

In particular in such an attachment zone design, but also in attachment zones of other designs, reliable release of the screen 110 can be facilitated by providing that the attachment is formed by a food grade heat sensitive adhesive including a constituent having a glass transition temperature lower than 92° C. and preferably lower than 85° C. The heat of the brewing liquid as used for brewing for instance coffee or tea causes the adhesive to become easily deformable, so that the attachment is released more easily.

Reliable release of the screen can also be enhanced by providing that the attachment is formed by a food grade adhesive that is water soluble or includes a water soluble constituent. Usually, the brewing liquid is water. Contact with the warm brewing liquid will cause the water soluble constituent of the adhesive to dissolve quickly, so that the screen will be released along the attachment zone 112.

Figure 5:
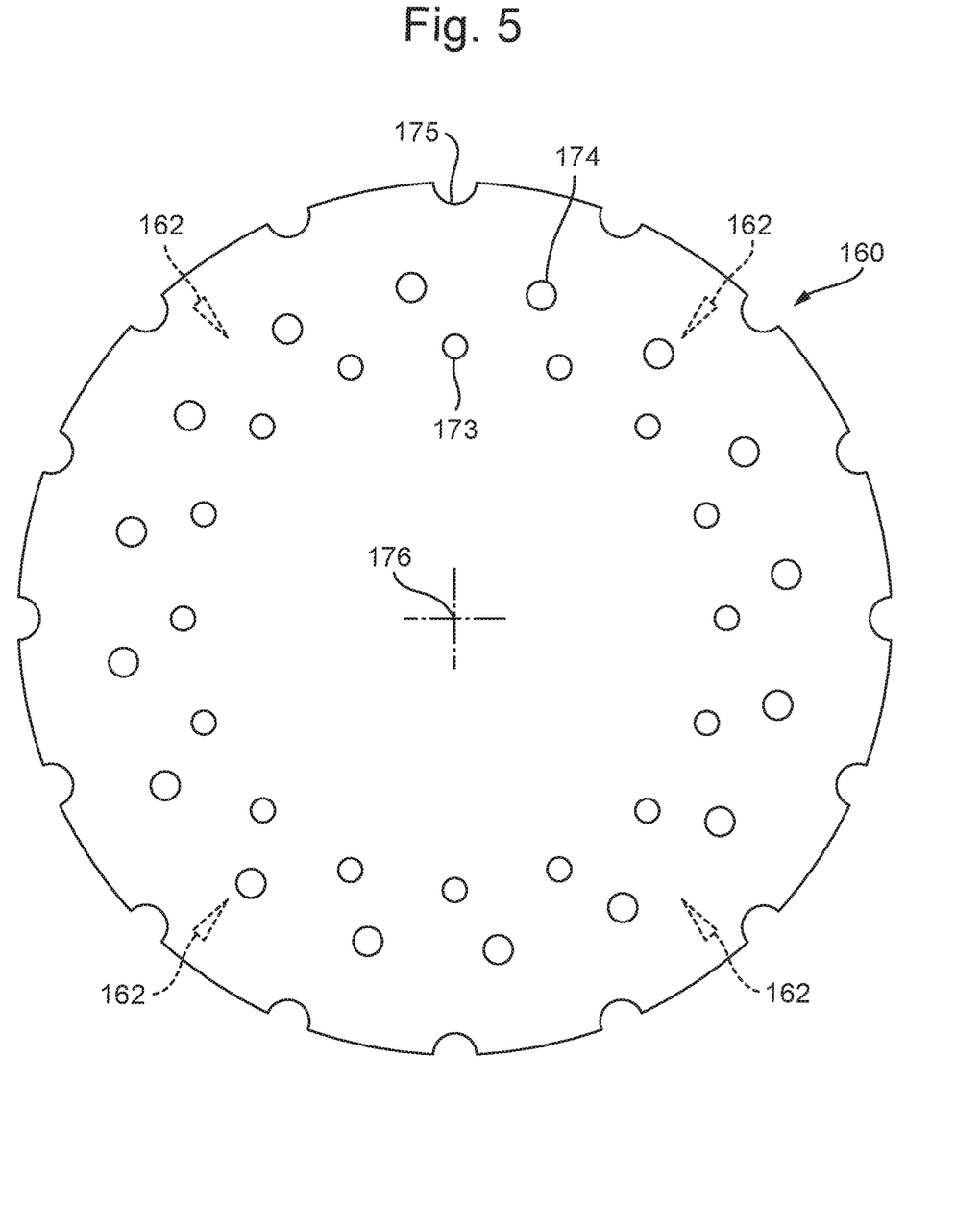
FIG. 5 is a top plan view of a screen of a fourth example of a capsule according to the invention.

In FIG. 5, a further example of a screen 160 for a capsule according to the invention is shown. In this example, the attachment zones 162 each have an inward end portion having a width decreasing in inward direction to a sharp point at the inward end. Thus, peeling off in a radially outward direction is initiated particularly easily.

The passages 173, 174, 175 are arranged in three annular zones concentric around the centre 176 of the screen 160. The passages 173, 174 in the inner rings are formed by openings in the material of the screen 160, which openings are circumferentially bounded by material of the screen 160. The passages 175 in the outer annular zone are formed by bays in the outer circumferential edge of the screen 160. The bays form areas of reduced flow resistance where water can pass between the perimeter of the screen 160 and the side wall of the capsule body.

Figure 6:
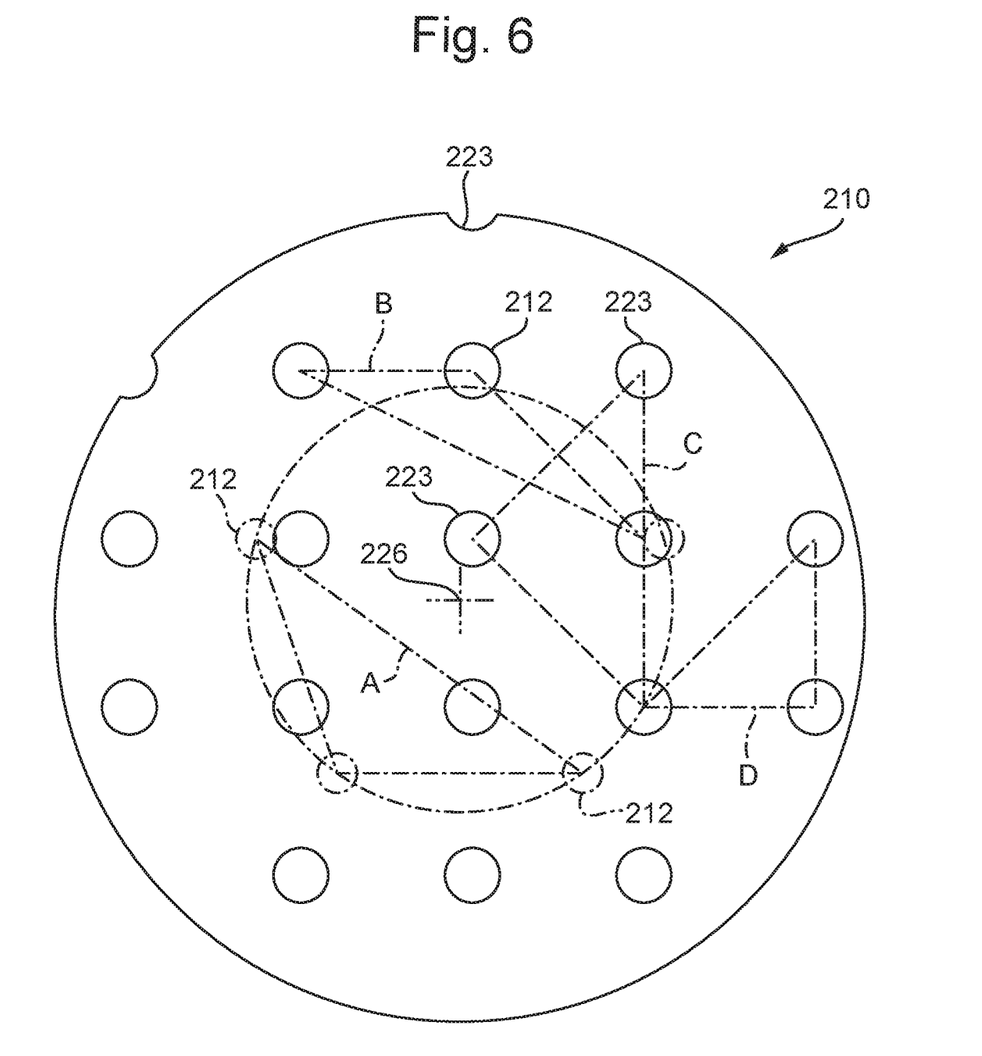
FIG. 6 is a top plan view of a screen of a fifth example of a capsule according to the invention.

In FIG. 6, yet another example of a screen 210 for a capsule according to the invention is shown. In this example, the passages 223 (not all designated by a reference number) are arranged in a pattern that is uniform over the entire surface area of the screen 210. An advantage of passages arranged according to a uniform pattern is that the screen material can be provided with the passages very efficiently before screens are severed out of the screen material. Then the screens can be cut or otherwise severed out of the patterned screen material.

In this example, the pattern is a uniform pattern of columns and rows at uniform mutual distances. However, also other patterns, such as patterns in which successive rows are mutually staggered in longitudinal direction, e.g. by half of the pitch between successive columns, or a pattern in which the passages are centred on corners of imaginary hexagonal cells.

In this example, the attachment zones 212 (not all designated by a reference number) are arranged in a pattern that is different than the uniform pattern of the passages 223. The location of the attachment zones 212 is determined by a tool for sealing the screen to the capsule body bottom and accordingly, to the extent that the screen 210 is centred inside the capsule body, centred in relation to the centre 226 and the outer circumference of the screen 210, but not determined in rotational sense about approximately the centre 226 of the screen 210. In contrast, the location of the uniform pattern on the screen 210 is (almost) completely random, because the screen is cut out of a web of screen material that has previously been provided with passages 223, without particular attention to the location of the pattern of the passages 223 relative to the centre 226 and outer edge of the screen. The attachment zones 212 are arranged in such a configuration that, regardless the placement of the uniform pattern of the passages 223 relative to the attachment zones, the attachment zones of a triangle of attachment zones 212 that are closest together (e.g. triangle of attachment zones A) can not simultaneously all fit completely (and preferably also not partially) within passages of any triangle of the passages 223 (e.g. passages 223 of the triangle of passages B or C or D). Thus, at worst, two neighbouring attachment zones 212 can fall within passages 223 and not contribute to attaching the screen 210 to the bottom of the capsule body. However, in that situation, other ones of the attachment zones 212 provide sufficient fixation of the screen 210 in the capsule body.

In the present example, the number of attachment zones is five, so that if two adjacent attachment zones 212 completely overlap with passages 223, the attachment zones adjacent to these two attachment zones will at least partially contribute to fixing the screen 210 and are located far enough apart to provide the required fixation of the screen 210 relative to the capsule body. The number of attachment zones may also be larger than five, but for a quick release during brewing and quick attachment by for instance heat sealing, it is preferred that the number of attachment zones is not larger than ten and more preferably smaller than eight.

For effectively distributing water to radially outer portions of the capsule and of the substance 59, it is advantageous if at least some of the passages 73 are arranged at a distance from the centre of more than 40% and more preferably more than 50% or more than 60% of the distance of a peripheral edge from the centre, measured in a direction from the centre to the respective passage. Racially outward water distribution is even further enhanced if this applies to all of the passages.

Racially outward water distribution (which may also be achieved effectively using a screen with a uniform pattern of openings) is particularly relevant if, as for instance in the examples shown in FIGS. 1-3, 15. The capsule body 2, 52 has an internal cross-sectional area along a plane parallel to the cove 7, 57, which is larger at the cover 4, 57 than at the bottom 3, 53. In such a capsule 1, 51, the cross-sectional area increases from the bottom 3, 53 to the cover 7, 57, i.e. in the direction of flow of water through the substance, so that the water will need to distribute over a larger cross-sectional area as it flows through the substance 9, 59. By leading a relatively large portion of the water radially outwardly while incurring only a relatively small pressure loss at the screen, it is ensured that water is also effectively distributed to outer regions of cross-sections of the substance close to the cover 7, 57.

Racially outward water distribution is even more relevant if a shoulder is provided in a side wall of said capsule body, the internal cross-sectional area being larger at a cover side of the shoulder than at a bottom side of the shoulder.

Particularly effective reductions of local flow resistance are achieved if at least some or all of the passages each have a cross-sectional surface area of at least 3 $mm^2$, for instance 3-7 $mm^2$, more preferably 4-5.5 $mm^2$ and/or a cross-sectional size of at least 1-4 mm. The cross-sectional size of the screen may for instance be 20-40 mm, for example 22-30 mm. The diameter of the bottom of the capsule may for instance be 20-40 mm, for example 22-30 mm. The diameter of the screen may be about the same as the diameter of the bottom at the inside of the capsule. The screen may for instance be provided with 4-30 passages, preferably about 15-25 passages. The screen area in which the passages are located may cover 50-100% of the bottom. In a practical embodiment the screen is provided with 15-18 passages each having a diameter of 1.5-2.5 mm, preferably 1.6-2.2 mm, more preferably of 1.6-1.8 mm.

The screen material may for instance have a specific weight of 20-200 $g/cm^2$, preferably 40-100 $g/cm^2$. The screen material may for instance have a thickness of 0.1-1 mm, preferably 0.2-0.5 mm. The screen material (without the passages) may for instance have an air permeability of 500-3000 $l/(m^2s)$ at a pressure drop of 100 Pa over the screen material, preferably between 1000 and 1500 $l/(m^2s)$ at a pressure drop of 100 Pa over the screen material.

The screen has a surface area that can be regarded as being composed of an inner surface area and an outer surface area surrounding the inner surface area, the inner surface area forming at least 25% of a total surface area of the screen and an inner portion of the passages in the inner surface area provide an open surface area of a first proportion of the inner surface area, while an outer portion of the passages in the outer surface area provide an open surface area of a second proportion of the outer surface area. It is then advantageous for outward water distribution if the second proportion is larger than the first proportion. The inner surface area may form at least 40%, 50% or 60% of the total surface area of the screen and the inner surface area may also be free of passages, at least prior to brewing. The inner surface area may have a circular boundary, a centre of the screen forming the centre of the inner surface area.

The screen is preferably of water permeable material (e.g. one or more layers of fibrous material, such as filter paper, felt material or woven material), so that not all of the water flow is concentrated through the passages. However, if the number of passages is sufficiently large and the passages are sufficiently evenly distributed, the screen may also be of water impermeable material.

Several features have been described as part of the same or separate embodiments. However, it will be appreciated that the scope of the invention also includes embodiments having combinations of all or some of these features other than the specific combinations of features embodied in the examples.

The invention claimed is:

1. A capsule comprising:
   a capsule body having a bottom, a side wall, an end opposite of the bottom and a flange extending outwardly from the side wall and around the open end; and
   a cover attached to the outwardly extending flange, the cover closing off the end of the capsule body opposite of the bottom;
   the capsule body and the cover bounding a capsule chamber, the capsule chamber containing:
   a substance constituted by a mass of loose, solid particles, for the preparation of a potable beverage by extracting and/or dissolving the substance by means of supplying a fluid under pressure into the capsule, and
   a screen comprising a material impermeable to said particles, said screen being positioned between said substance and said bottom and attached to said capsule body;
   wherein said screen is attached to said capsule body in such a manner that the screen releases from the capsule body during brewing,
   wherein the screen is arranged to move away from the centre area of the bottom under influence of piercing elements by means of which, in use, openings are pierced in the bottom of the capsule for injecting fluid into the capsule and/or under influence of fluid injected via openings in the bottom which openings are created by piercing means wherein the screen is attached by at least one attachment, said attachment being arranged for tearing apart during brewing; and wherein the attachment constitutes at least one attachment zone, that is elongated in a radial direction and has a most inward end radially spaced from a central axis of the capsule.

2. The capsule according to claim 1, wherein the at least one attachment zone has a width decreasing in an inward direction.

3. The capsule according to claim 1, wherein said screen is attached to said capsule body in such a manner that the screen releases completely from the capsule body during brewing.

4. The capsule according to claim 1, wherein said screen is attached to said capsule body along attachment zones spaced from the centre and circumferentially spaced from each other.

5. The capsule according to claim 4, wherein all of said attachment zones are distributed adjacent a peripheral edge of the screen.

6. The capsule according to claim 1, wherein the screen comprises a water permeable material.

7. The capsule according to claim 1, wherein the screen is not attached to a centre area of the bottom.

8. The capsule according to claim 1, wherein the screen covers the entire internal surface area of the bottom of the capsule body.

* * * * *